United States Patent [19]

Higomura

[11] Patent Number: 4,710,865
[45] Date of Patent: Dec. 1, 1987

[54] CONTROL SYSTEM FOR POSITIONING AN OBJECT USING SWITCHING FROM A SPEED CONTROL MODE TO A POSITION CONTROL MODE WITH ADJUSTABLE BRAIN

[75] Inventor: Makoto Higomura, Yokohama, Japan

[73] Assignee: Canon Kabushiki Kaisha, Tokyo, Japan

[21] Appl. No.: 797,030

[22] Filed: Nov. 12, 1985

[30] Foreign Application Priority Data

Nov. 14, 1984 [JP] Japan ............................ 59-238665
Nov. 16, 1984 [JP] Japan ............................ 59-240419
Nov. 16, 1984 [JP] Japan ............................ 59-240420

[51] Int. Cl.$^4$ ............................................. G05B 11/00
[52] U.S. Cl. ................................. 364/170; 364/182; 364/157; 364/474; 318/592; 318/594
[58] Field of Search .......... 364/182, 157, 170, 474.28; 318/591, 592, 594

[56] References Cited

U.S. PATENT DOCUMENTS 4,494,203 1/1985 Suzuki ............................ 364/170
4,551,664 11/1985 Wong ............................. 318/592

Primary Examiner—Jerry Smith
Assistant Examiner—Allen MacDonald
Attorney, Agent, or Firm—Fitzpatrick, Cella, Harper & Scinto

[57] ABSTRACT

A control system for positioning a movable member, includes a first control portion operative to move the movable member at a relatively high moving speed toward a position which is in proximity to a target stop position, the first control portion also being operative to decrease the moving speed of the movable member to a creep speed when the movable member moves from a predetermined deceleration starting position to said position in proximity to said target stop position; a second control portion operative on the movable member, after the creep speed is established, to place the movable member at said target position with a relatively high positional accuracy; a detector for detecting a positional error of the movable member with respect to reference at a time when said creep speed is established; and a third control portion for changing the deceleration starting position on the basis of detection by the detector.

9 Claims, 24 Drawing Figures

F I G. I

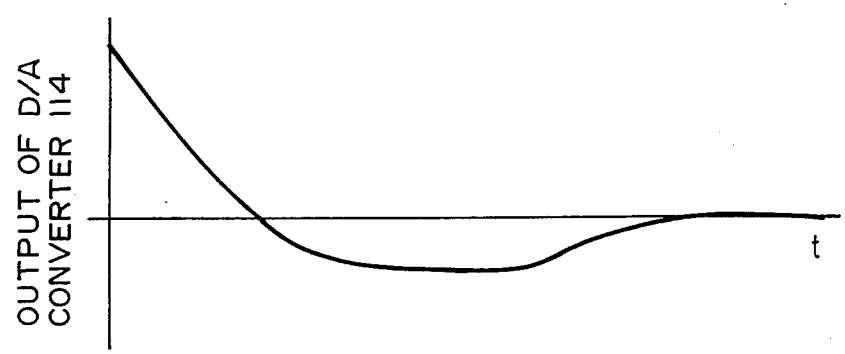
F I G. 11A
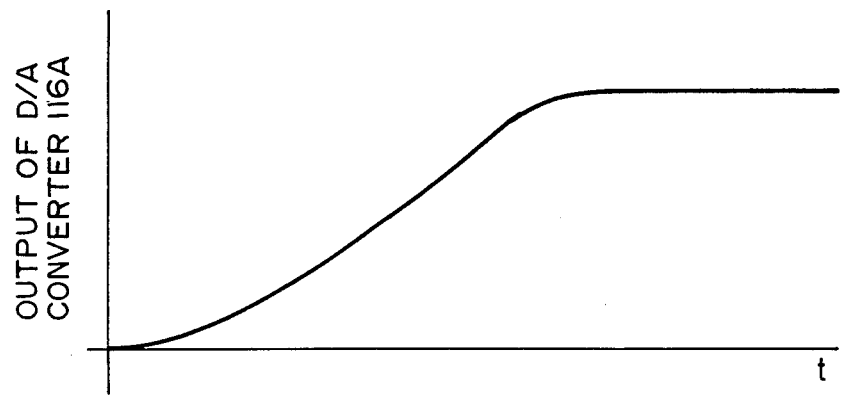
F I G. 11B
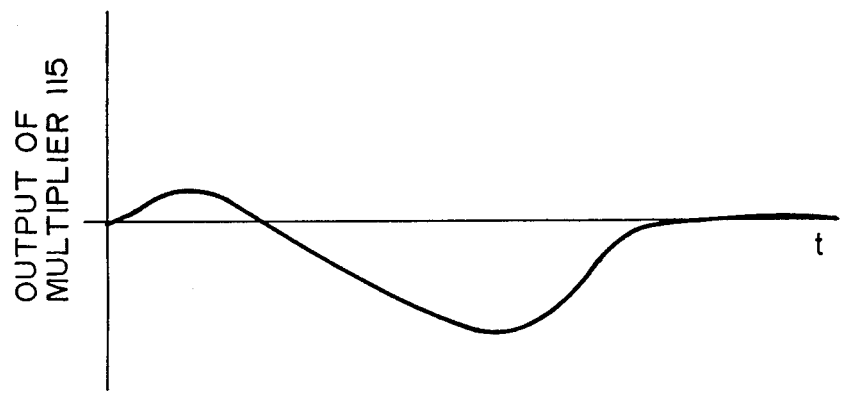
F I G. 11C

| TARGET POS NO. | 0 mm | 14 mm | 28 mm |
|---|---|---|---|
| 0 | 1 | 1 | 1 |
| 1 | 1 | 1 | 1 |
| 2 | 2 | 1 | 1 |
| 3 | 3 | 2 | 2 |
| ≈ | ≈ | ≈ | ≈ |
| 126 | 28 | 27 | 26 |
| 127 | 28 | 27 | 27 |

FIG. 15

| DIFF (μm) \ TARGET POS | 0 mm | 14 mm | 28 mm |
|---|---|---|---|
| 0 | 28 | 28 | 28 |
| 0.1 | 28 | 28 | 28 |
| 0.2 | 28 | 27 | 27 |
| 0.3 | 28 | 27 | 26 |
|  |  | 26 | 26 |
| ≈ | ≈ | ≈ | ≈ |
| 19.8 | 3 | 2 |  |
| 19.9 | 2 | 1 | 1 |
| 20.0 | 1 | 1 | 1 |

FIG. 17

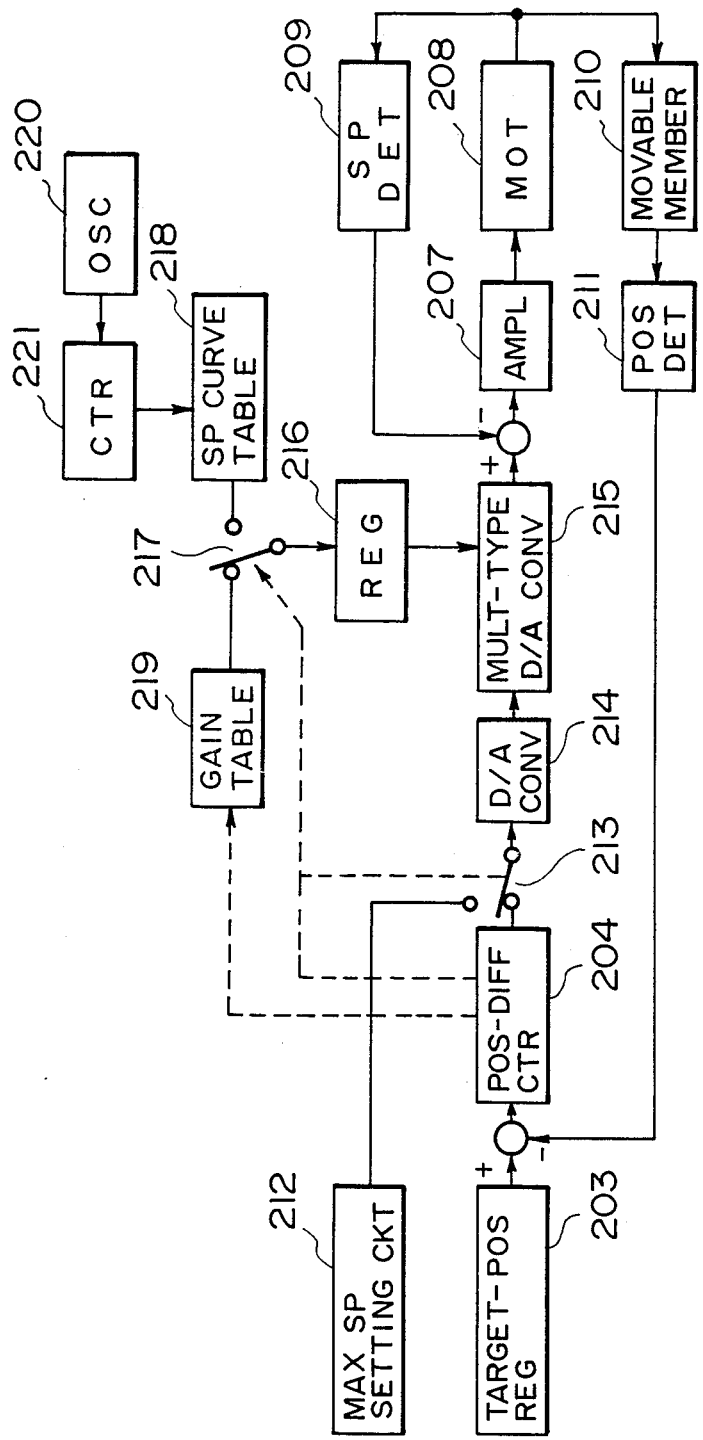
F I G. 16

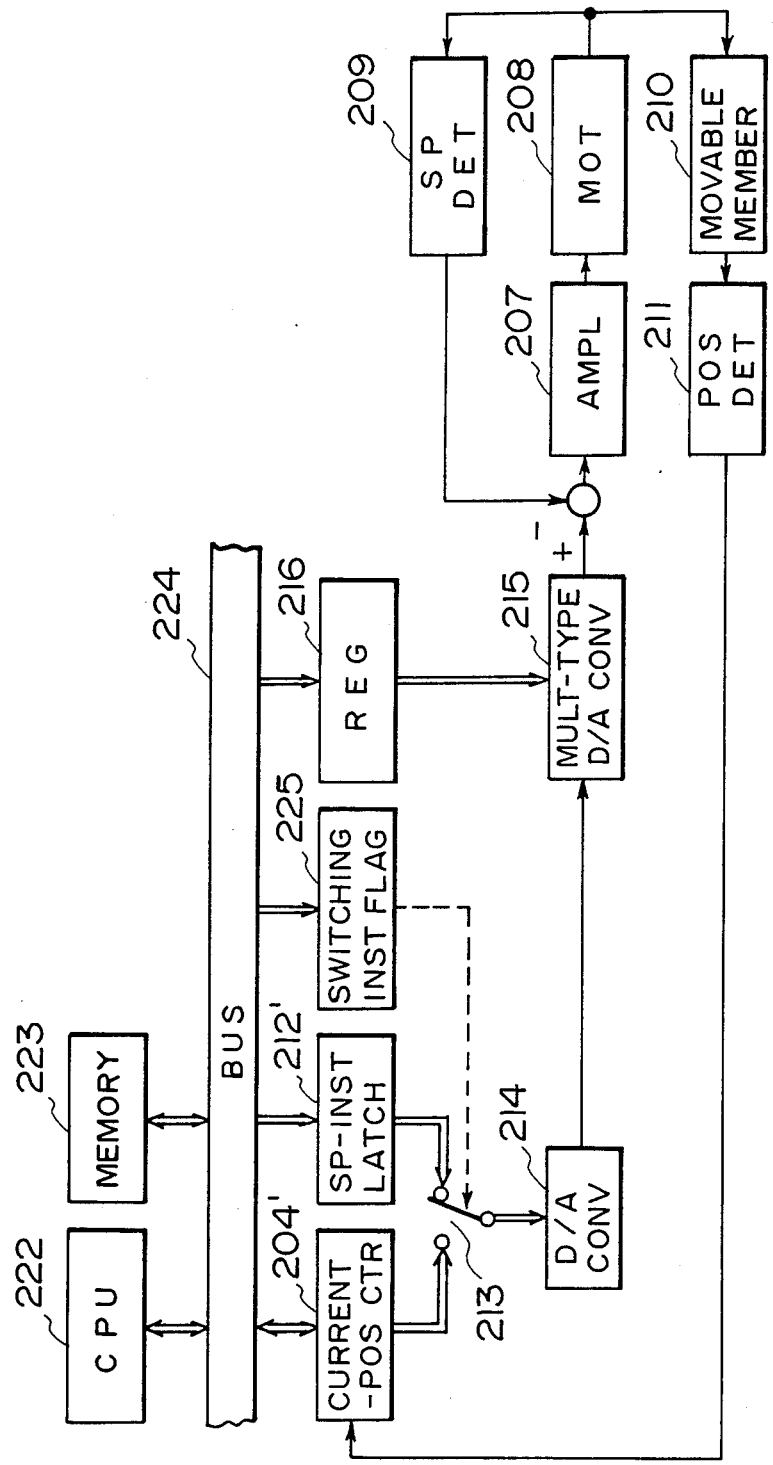
F I G. 19

CONTROL SYSTEM FOR POSITIONING AN OBJECT USING SWITCHING FROM A SPEED CONTROL MODE TO A POSITION CONTROL MODE WITH ADJUSTABLE BRAIN

FIELD OF THE INVENTION AND RELATED ART

This invention relates to a control system for positioning a movable member and, more particularly, to a control system for positioning such a movable member that should be moved stepwise by a certain distance (per each stepwise movement) or moved repeatedly through a certain distance. The system to which the invention pertains is applicable to semiconductor-device manufacturing apparatuses such as step-and-repeat type exposure apparatuses, IC bonders, etc., industrial robots, NC machining apparatuses or the like, for precisely positioning a stepwisely movable or repeatedly movable member such as a semiconductor wafer carrying stage, an arm of the robot or the like.

An example of such control system for positioning a movable member is diagrammatically shown in FIG. 1. The system is arranged so that the movable member is displaced generally in accordance with a speed curve A (solid line) shown in an upper part of FIG. 2. In this part of FIG. 2, the range from point a to point e is a speed-controlling region. At the point e which is in the vicinity of a target or aimed stop position, the control mode is changed to a position-controlling mode whereby the movable member is finally positioned at a high level of accuracy. In FIG. 2, point a is an acceleration starting point; point b is an acceleration terminating point from which the movable member is moved at a maximum constant speed; point c is a deceleration starting point; point d is a deceleration terminating point from which the movable member is moved at a constant low or creep speed; point e is a control-mode changeover point; and point f is a positioning completion point.

More specifically, the region ranging from point a to point e, i.e. the acceleration region, is controlled on the basis of time. In other words, the acceleration is continued for a preset time. On the other hand, the deceleration starting point c is controlled on the basis of the position of the movable member. That is, the constant-speed driving region (the region ranging from point b to point c) is continued until the movable member reaches a predetermined position. When the movable member reaches the predetermined position, the deceleration is initiated. The deceleration region ranging from point c to point d is controlled on the basis of time. That is, the deceleration is continued for a predetermined time period. The mode changeover point e is controlled on a basis of the position of the movable member. That is, when the movable member moving at the creep speed reaches a predetermined position which is short of the target position by a predetermined small distance, the control mode is changed to the position-controlling mode.

Referring back to FIG. 1, during the speed-controlling mode, an analog switch 6 selects a speed-instructing digital-to-analog converter 2 (which hereinafter "D/A converter"). A speed function generator 1 produces output signals corresponding to the speed curve segments a–b, b–c, c–d, and d–e, which signals are applied to the D/A converter 2 whereby speed-instructing voltages are produced. An amplifier 7, a motor 8 and a speed detector 9 define a closed loop which is effective to control the movement of the movable member is a speed-feedback control manner. Thus, the movable member 10 is moved at a varying speed corresponding to a varying speed-instructing voltage supplied from the D/A converter 2. When the movable member 10 reaches the control mode changeover position e, the position-controlling mode adapted to position the movable member with a high accuracy is selected in place of the speed-controlling mode. For this purpose, the analog switch 6 selects a positional-difference outputting digital-to-analog converter 5 (which hereinafter "D/A converter"). A closed loop defined by a positional-difference counter 4, D/A converter 5, amplifier 7, motor 8, movable member 10 and position detector 11 provides a position-feedback control system.

In such arrangement as described above, it is possible that the actual movement of the movable member does not follow the speed curve A in FIG. 2, due to any error in gain adjustment of the amplifier 7, drift, disturbance such as changes in the friction force at any sliding components, etc. In some cases, the creep speed period varying from the deceleration terminating point d (FIG. 2) to the point e for the changeover to the position-controlling mode becomes longer, such as shown by a broken line B in FIG. 2. This obstructs realization of high-accuracy and quick positioning of the movable member.

Conventionally, in another aspect, each of the speed-controlling loop and the position-controlling loop has a fixed gain. Due to any fluctuation in the load, in the friction present in a sliding component or in the rigidity of the system, there may occur oscillation at the time of changeover to the position-controlling mode. Also, a steady positioning error (an error in the actual stop position with respect to the target stop position) will be large. Moreover, the magnitude of such steady positioning error is not constant depending on the position aimed or the direction of movement. The loop gain is held at a relatively low level in order to preclude that the positioning operation becomes unstable due to oscillation or the like.

SUMMARY OF THE INVENTION

It is accordingly a primary object of the present invention to provide a control system for positioning a movable member, which system assures high-accuracy positioning of the object in a decreased amount of time.

It is another object of the present invention to provide a control system for positioning a movable member, which system assures minimization of a steady positional error and of changes in the steady positional error depending on the position aimed or the direction of movement, thereby to improve the positioning accuracy.

Briefly, according to one aspect of the present invention, there is provided a control system for positioning a movable member, the system including first control portion operative to move the movable member at a relatively high moving speed toward a position which is in proximity to a target position, the first control portion also being operative to decrease the moving speed of the movable member to a creep speed when the movable member moves from a predetermined deceleration starting position to said position in proximity to said target position; a second control portion operative on the movable member, after the creep speed is established, to locate the movable member at said target position with a relatively high positional accuracy; a detector for detecting a positional error of the movable member with respect to reference when said creep speed is established; and a third control portion for changing the deceleration starting position on the basis of detection by the detector.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 11A–11C illustrate the principle of multiplication according to the embodiment of FIG. 9.

FIG. 15 shows the content of a two-dimensional gain table.

FIG. 16 is a block diagram showing a control system according to a sixth embodiment of the present invention.

FIG. 17 shows the content of a gain table used in the FIG. 16 embodiment.

FIG. 19 is a block diagram showing a control system according to an eighth embodiment of the present invention.

DESCRIPTION OF THE PREFERRED EMBODIMENTS

Figure 3:
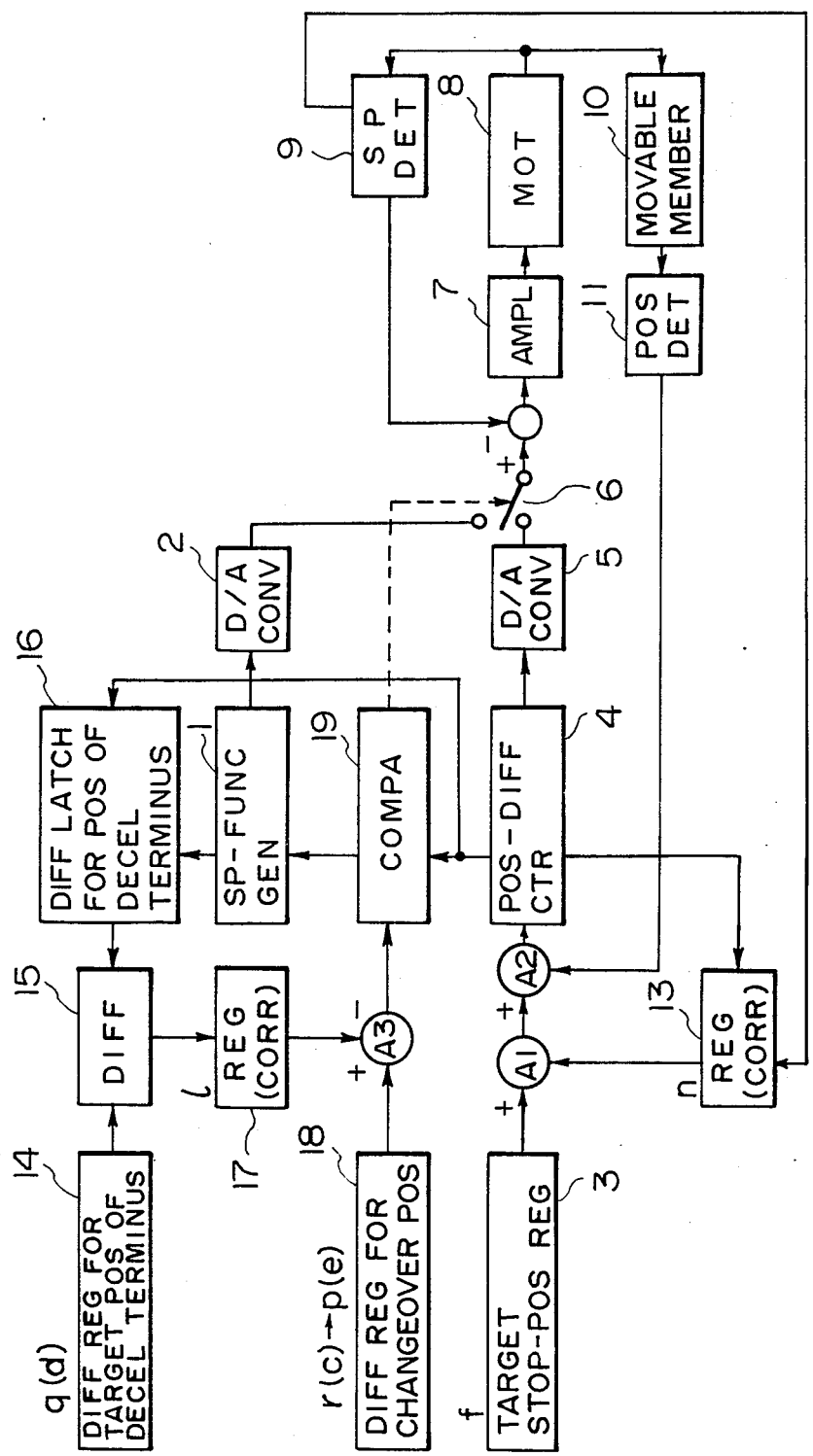
FIG. 3 is a block diagram showing a control system according to one embodiment of the present invention.

Referring now to FIG. 3, there is diagrammatically shown a control system for positioning a movable member, according to a first embodiment of the present invention.

As shown in this Figure, the control system includes a speed function generator for producing speed-instructing signals; a digital-to-analog converter 2 (which hereinafter "D/A converter") for converting the speed-instructing signals into speed-instructing voltages; a target stop-position register 3 for storing an absolute value f related to a target or aimed stop-position; a positional-difference counter 4 for storing a positional difference between the target step-position and a current position of a movable member 10; a digital-to-analog converter 5 (which hereinafter "D/A converter") for converting an output of the counter 4 related to the positional difference into a positional-difference voltage; an analog switch 6 adapted to change the operation mode of the control system between a speed-controlling mode and a position-controlling mode; an amplifier 7 which is a servo amplifier; a motor 8 for driving the movable member 10 such as a slidable table, an arm of a robot, etc.; a position detector 11 which comprises a rotary encoder, a linear scale or a laser interferometer to detect the current position of the movable member 10 and which also includes a register for storing the detected current position of the movable member 10; a register 13 for storing any positional error of the movable member 10 after completion of the positioning of the same; a difference register 14 for storing the data related to a target position of a deceleration terminating point, the register being arranged to store a difference q from a target stop position (see FIG. 2), not an absolute value d; a differentiator 15 for calculating any error of an actual deceleration completion position, defined during the preceding positioning operation, with respect to the target or aimed deceleration completion position; a differential latch 16 for storing the data related to the actual deceleration completion position during the preceding positioning operation, the latch being arranged to store a positional difference m (see FIG. 2) between the deceleration completion position and the target stop position; a register 17 for storing an amount of correction l for the deceleration starting position; a difference register 18 for storing the data related to the deceleration starting position and the mode changeover position, the register being arranged to store a positional difference r (see FIG. 2) for the deceleration starting point c and a positional difference p for the mode changeover point e; a comparator 19 for comparing the current position of the movable member 10 with the preset data on the deceleration starting position or the mode changeover position; and adding-/substracting circuits A1–A3.

Description will now be made to the operation of the control system shown in FIG. 3.

At the time of first positioning operation of the control system or when, in operation, an operative condition such as a maximum speed, a speed function, etc. is changed, all the counters and registers are cleared. By an operator's input operation or in response to an instruction signal supplied from a main control unit of an apparatus to which the subject control system is incorporated, appropriate data can be set in the register 14 or the data already set in the register 14 can be changed appropriately.

The control system of FIG. 3 is arranged such that, in accordance with the operator's input operation or instruction signals supplied from the main control unit, the target stop position f is set in the target stop-position register 3, a differential position r (see FIG. 2) for the deceleration starting position is set in the register 18, and a differential position q for the deceleration completion position is set in the register 14. The comparator 19 compares the positional difference signal produced from the positional difference counter 4 with the changeover position signal produced from the register 18. If the former is greater than the latter, the comparator 19 acts on the analog switch 6 to move it to a speed-controlling selecting position. At the same time, the comparator 19 triggers the speed function generator 1. Whereby, the speed-controlling mode is initiated. If, on the other hand, the positional difference signal supplied from the counter 4 becomes less than the changeover position signal, the speed-controlling mode is stopped and the position-controlling mode is initiated.

In the speed-controlling mode, the speed function generator 1 produces output signals designating a particular speed curve. So, corresponding speed-instructing voltages are outputted from the D/A converter 2 which voltages are applied by way of the analog switch 6 to a speed servo system (a closed loop defined by the amplifier 7, the motor 8 and the speed detector 9). By this, the movable member 10 will be moved according to an actual speed curve similar to the speed curve B shown in FIG. 2 described in the foregoing. As the movable member 10 moves, the contents in the counter 4 and the register 18 become equal to each other. This is detected by the comparator 19 and, in response thereto, the speed function generator 1 instructs the initiation of deceleration. Thus, at point c' in FIG. 2, the deceleration is initiated. After elapse of a predetermined time period, the deceleration is stopped (at point d') and the movable member 10 is moved at a constant lower or creep speed. The positional difference m (FIG. 2) from the target stop position, at the time at which the deceleration is terminated and the creep speed is established, is stored in the latch 16.

On the other hand, the positional difference p (FIG. 2) for the control mode changeover position e is set in the register 18. When, as the movable member 10 moves at the creep speed, the contents of the register 18 and the counter 4 become equal to each other (at point e in FIG. 2), the comparator 19 acts on the analog switch 6 to move it to a position-controlling selecting position. In the position-controlling mode, the positional difference counter 4, the D/A converter 5, the amplifier 7, the motor 8, (the movable member 10) and the position detector 11 define a closed loop, whereby the movable member 10 is positioned with a higher accuracy.

After completion of the positioning, the content of the positional difference counter 4 which represents, at this time, the steady positional error n (FIG. 2), is stored in the register 13. Similarly, the difference between the target position of deceleration completion (positional difference q) stored in the register 14 and the actual deceleration completion position (positional difference m) stored in the latch 16 is detected by the differentiator 15, and the thus detected difference is stored in the register 17.

These data stored in the registers 13 and 17, respectively, are used to change the target stop-position and the deceleration starting position, respectively, for the subsequent or second control operation, in accordance with the present invention. The principle of this will now be described in conjunction with FIG. 2.

Figure 1:
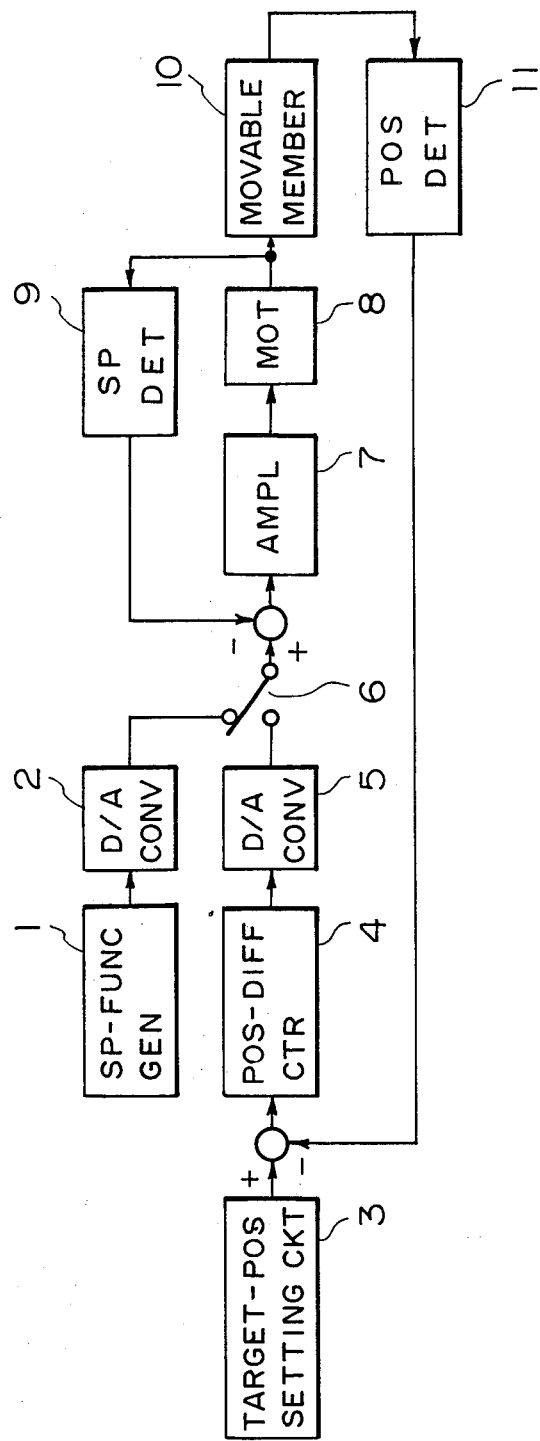
FIG. 1 is a block diagram showing an example of known type control system for positioning a movable member.
Figure 2:
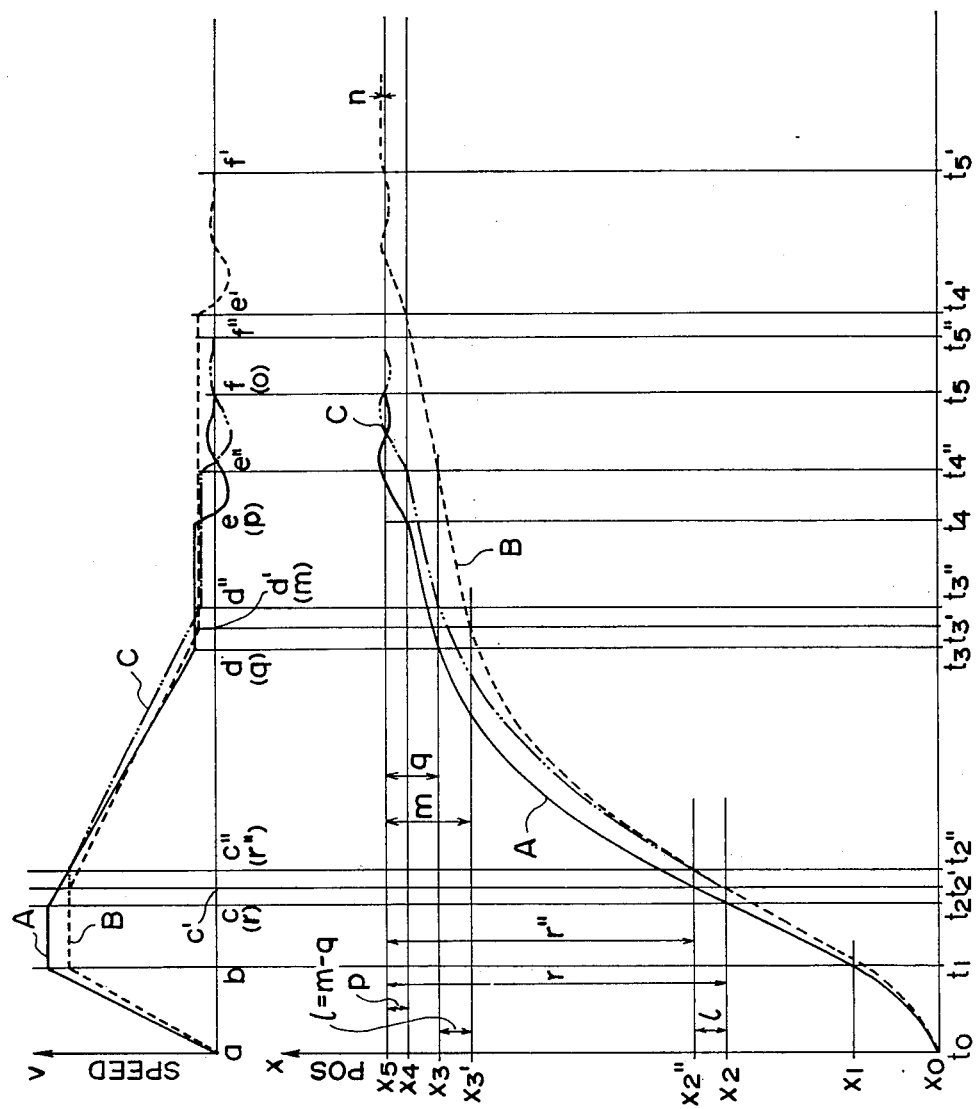
FIG. 2 is a graph showing a desirable speed curve, an actual speed curve according to the system of FIG. 1 and a speed curve according to the present invention.

In FIG. 2, as described in the foregoing, the reference or desired speed curve A consists of regions a–b, b–c, c–d, d–e and e–f. The acceleration is initiated at point a which corresponds to time t0 and a position x0; the acceleration is terminated at point b which corresponds to time t1 and a position x1, the acceleration being controlled on the basis of the time from t0 to t1; the deceleration is initiated at point c which corresponds to time t2 and a position x2, the initiation of the deceleration being controlled on the basis of the position of the movable member; the deceleration is terminatd at point d which corresponds to time t3 and a position x3, the deceleration period being controlled on the basis of the time from t2 to t3; the speed-controlling mode is changed to the position-controlling mode at point e which corresponds to time t4 and a position x4, the changeover of the control mode being controlled on the basis of the position of the movable member; and the positioning is completed at point f which corresponds to time t5 and a position x5. At time t2 corresponding to the decleration initiating point c, the positional difference of the movable member from the target stop position is r ($=x5-x2$). Also, at time t3 corresponding to the deceleration completion point d, the positional difference of the movable member from the target stop-position is q ($=x5-x3$). At time t4 corresponding to the mode changeover point e, the positional difference of the movable member from the target stop-position is p ($=x5-x4$).

Actually, however, it is possible that the movement of the movable member does not follow the speed curve A, as described in the foregoing. The speed curve B (broken line) in FIG. 2 is a case where the actual speed becomes lower than the reference speed due to the friction force or the like. If the movable member 10 is moved along the speed curve B, the maximum speed is lowered as compared with the reference speed curve A. Since the deceleration is initiated at the time when the movable member reaches the position x2, the decrease in the maximum moving speed results in a delay of time of initiation of the deceleration. That is, according to the speed curve B, the deceleration is initiated at time t2' which is later than time t2 by a period (t2'−t2). Since the deceleration is effected for a predetermined fixed time period as described in the foregoing, the deceleration is terminated according to the speed curve B at time t3', wherein (t3'−t2')=(t3−t2).

The amount of movement made during the deceleration period from point c to point d in the speed curve A is given by the following equation:

$$(x3-x2)=(Vb+Vd)\times(t3-t2)/2$$

where Vb is the maximum speed and Vd is the creep speed.

As compared therewith the amount of actual movement made during the deceleration period from point c' to point d' in the speed curve B is given by the following equation:

$$(x3'-x2)=(Vb'+Vd')\times(t3'-t2')/2$$

where Vb' is the actual maximum speed and Vd' is the actual creep speed.

Since Vb>Vb', Vd>Vd' and (t3−t2)=(t3'−t2'), it follows the difference l between the deceleration terminating positions x3 and x3' of the speed curves A and B is:

$$l = (x3 - x3')$$
$$= [(Vb - Vb') + (Vd - Vd')] \times (t3 - t2)/2 > 0$$

It is seen from the above that, according to the speed curve B, the deceleration is terminated at a position short of the target position (x3) for deceleration termination.

After the deceleration terminating point d', the movable member is moved at the creep speed (low and constant speed) until it reaches the control mode changeover position x4 (corresponding to the positional difference p from the target stop-position). Since the amount of movement to be made during this creep-speed period, according to the curve B, is 1+(q−p) which is longer by a distance 1 than that of the speed curve A (i.e., "q−p"), it requires a longer time period to complete the creep-speed movement to reach the position x4. Thus, according to the speed curve B, the changeover of the control mode is effected at point e' corresponding to time t4'. Thereafter, by the position controlling, the movable member is stopped at a position in close proximity to the target position x5, whereby the positioning is completed (at point f' corresponding to time t5'). Accordingly, a prolonged time period is required to actually complete the positioning, as compared with the case of the reference speed curve A.

Such problem can be obviated according to this embodiment of the present invention. That is, the time required for completing the positioning of the movable member can be reduced in accordance with this embodiment of the present invention. More specifically, in this embodiment, the reduction in the time for the positioning is acheived by correcting the above-described error "1" (the positional deviation in respect to the deceleration terminating point). More particularly, the correction of the error 1 is performed during the higher-speed period ranging from the point b. For this purpose, according to this embodiment, the deceleration is initiated at a time later than the time t2' and when the movable member is moved to a position which is beyond the target position x2, for the deceleration initiation, by a distance corresponding to the error 1 (=m−q). Since Vb'>Vd' as described in the foregoing and the time required for the movement is in inverse proportion to the moving speed, 1/Vb'<1/Vd'. It is seen from the above that, according to this embodiment of the present invention, the positional error 1 can be corrected in a decreased time period.

In summary, according to this embodiment, the deceleration is initiated at a time at which the movable member reaches a position having a positional difference r" (FIG. 2) which is equal to r−1. The distance is the difference between the distance m and the distance q, so 1=m−q.

In FIG. 2, a dash-and-dots line C shows a portion of the speed curve according to this embodiment of the present invention. It is seen from FIG. 2 that, according to the speed curve C, the deceleration is initiated at position x2" which is beyond the position x2 by a distance 1 so that the time of initiation of deceleration is delayed (by t2"−t2). However, the deceleration terminating position corresponding to time t3" is x3 which is the same as that in the case of the reference speed curve A. This is because the speed curves A and C have the same speeds at the time of initiation of deceleration, the same speeds at the time of termination of deceleration, and the same time period of deceleration (t3−t2=t3"−t2"), so that the amount of movement during the deceleration period in the speed curve C is equal to that in the speed curve A. The only difference lies in the time of termination of deceleration. Therefore, the amount of movement to be made during the creep-speed period in the case of the speed curve C becomes equal to that of the speed curve A. Actually, the time t4"−t3" is slightly greater than time t4−t3 because the actual creep speed is slightly lower than the reference speed. However, the distance of such creep-speed movement is very small, so there would not occur a significant difference between the creep-speed periods of the curves A and C. Thus, the positioning according to the speed curve C is completed at time t4" which is shorter than time t4' in the case of the speed curve B.

Referring back to FIG. 3, upon initiation of the second time of control operation, the same values f, q and r as those in the first time of control operation are set in the registers 3, 14 and 18, respectively. Actually, however, the values f and r set in the registers 3 and 18 are changed or corrected by the adding/subtracting circuits A1 and A3, respectively, when they are applied to associated elements. As described in the foregoing with reference to FIG. 2, the positional difference r" (c") of the new or corrected target position for the deceleration initiation is obtainable in the following manner:

That is, the difference 1 between the target position q of the deceleration termination and the position m of the actual deceleration termination assumed in the first time of control operation is detected by the differentiator 15 shown in FIG. 3. By an amount corresponding to the thus detected deviation 1, the deceleration starting position is corrected. Accordingly, the positional difference r" for the new deceleration starting target-position becomes equal to r−1. Similarly, the new target stop-position for the second control operation becomes equal to that obtained by subtracting the error n detected by the counter 4 from the target stop position x5 (f). In this manner, the result of "learning" acquired in the first time of control operation is utilized in the second control operation. By this, the speed curve C shown in FIG. 2 can be realized. It is seen from FIG. 2 that the correction of the deceleration starting point on the basis of the result of "learning" effectively causes reduction in the time for the positioning (from time f' to time f"), while realizing more accurate positioning.

Figure 4:
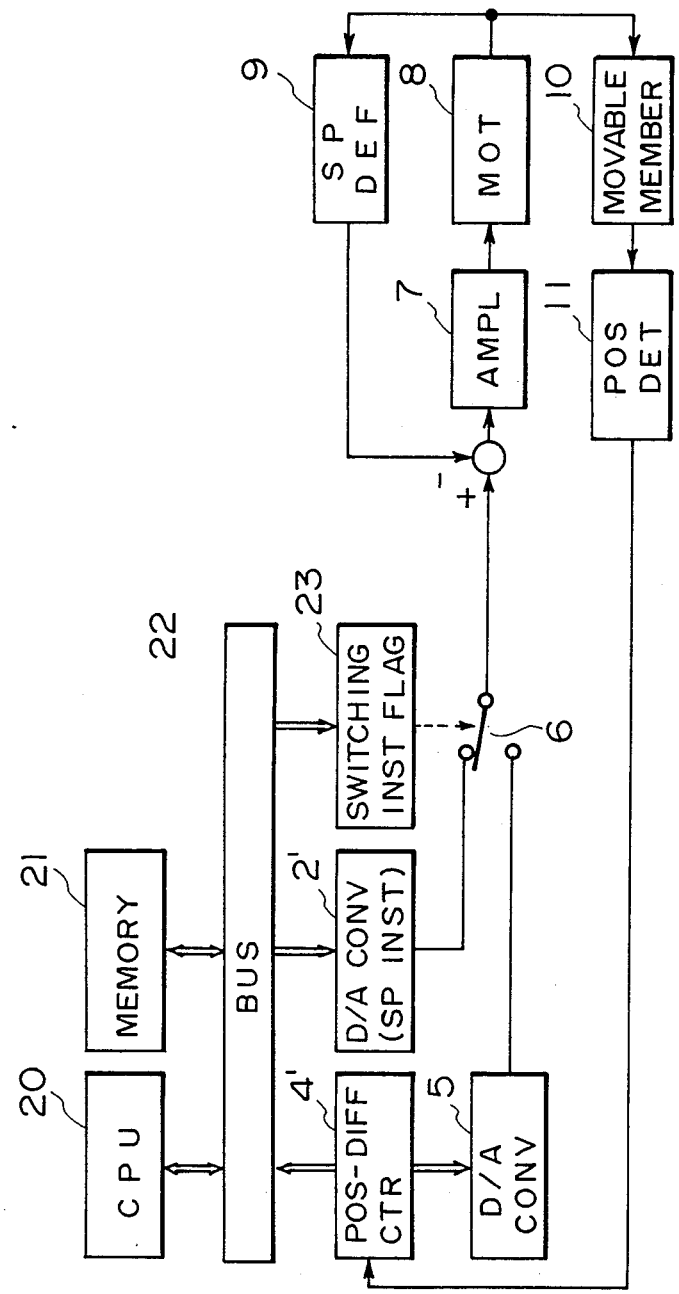
FIG. 4 is a block diagram showing a control system according to a second embodiment of the present invention.

Another embodiment of the present invention will be described with reference to FIG. 4. In this embodiment, the control system includes a central processing unit 20 such as a microcomputer, a memory device 21 such as a read only memory, a random access memory, etc., a bus 22 of the computer and a switching instructing flag 23 for selecting the position of an analog switch 6.

This embodiment is a modification of the FIG. 3 embodiment and the software of the computer has the functions of the elements denoted by blocks 1 and 13–19 shown in FIG. 3.

Figure 5A:
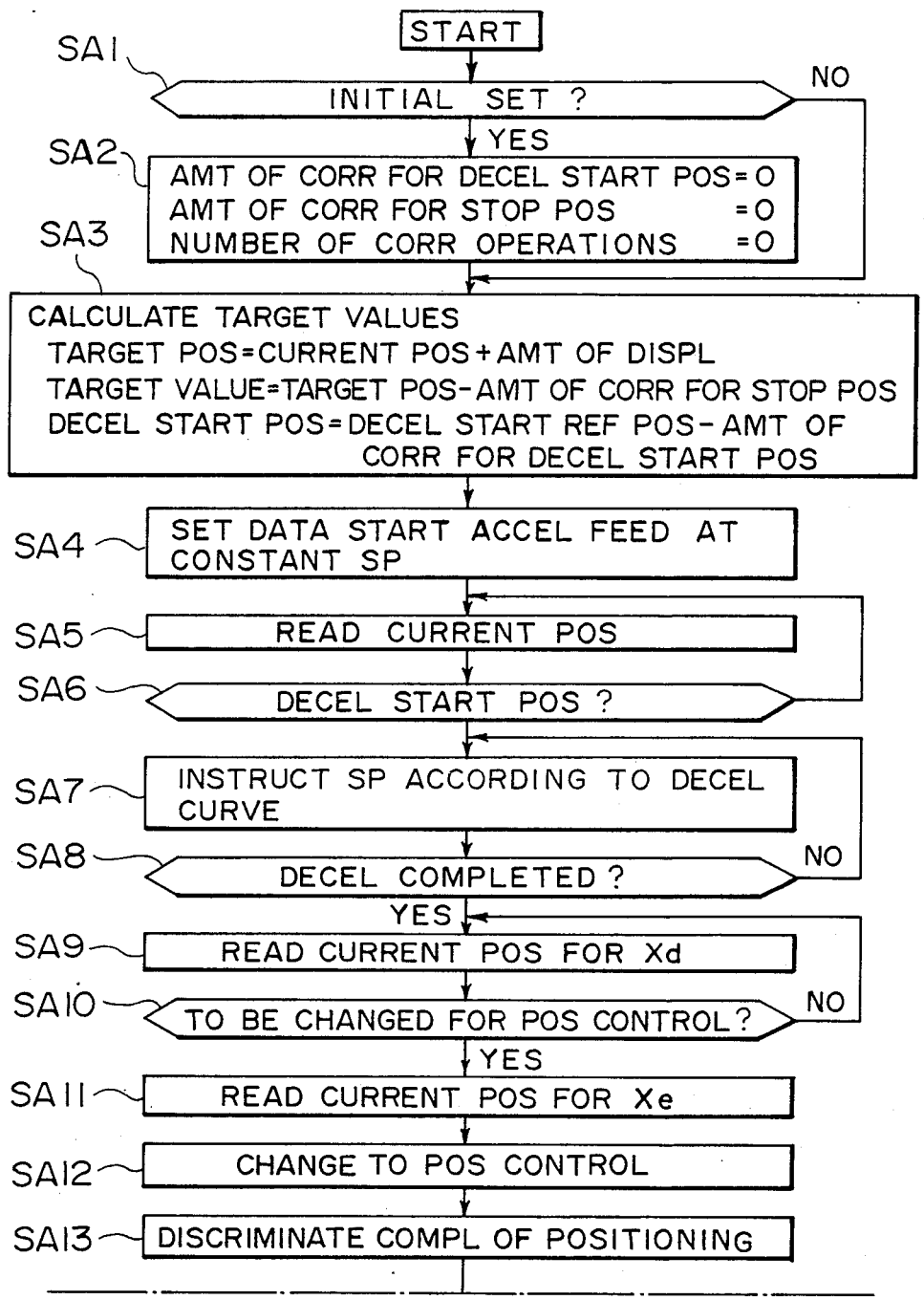
FIGS. 5A and 5B are flow charts showing the control operation of the system of FIG. 4.
Figure 5B:
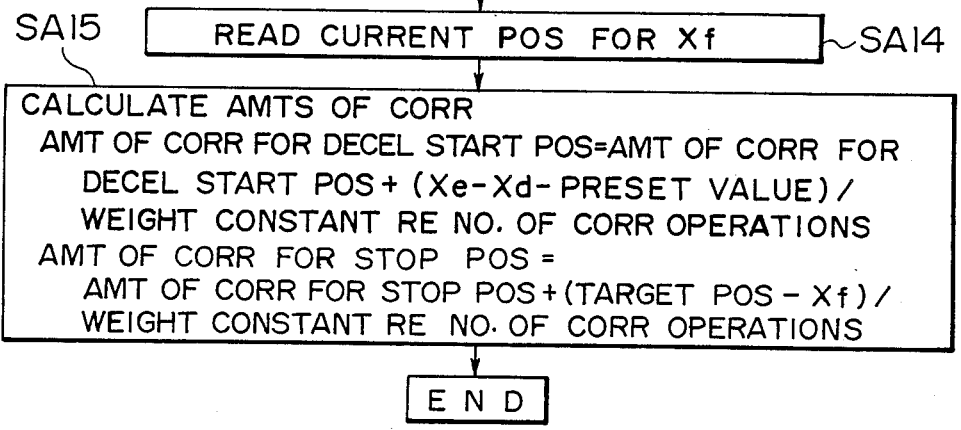
Figure 5:
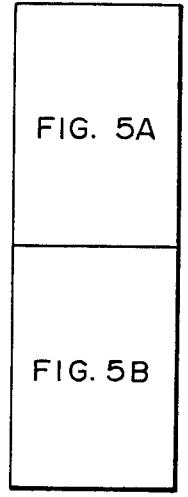

The operation of the control system of the FIG. 4 embodiment will now be described in conjunction with a flow chart of FIG. 5.

When the movable member 10 is to be positioned at the first time, or when, in operation, a set condition or conditions are changed, various correction values are initialized at Step SA1. That is, the amount of correction for the deceleration starting position, the amount of correction for the stop position and the number of correcting operations are all made null (Step SA2).

First, in the positioning operation, a target value which is the difference between the target stop position and the amount of correction for the stop position is calculated at Step SA3. The target stop position is equal to the sum of the current position and the amount of displacement (distance). Also, the target stop position is a position at which the movable member 10 is to be finally placed.

Subsequently, the computer produces speed-instructing signals based on the speed curve A shown in FIG. 2, which signals are applied to the speed controlling system by way of a digital-to-analog converter 2' (which hereinafter "D/A converter") and the analog switch 6. By this, the movable member 10 is displaced. During movement of the movable member 10, the deceleration terminating position Xd, the control mode changeover position Xe and the positioning completion position Xf are detected on the basis of the counting by a positional-difference counter 4' (see Steps SA4–SA14).

Subsequently, the amount of correction for the deceleration starting position and the amount of correction for the stop position are calculated at Step SA15. The calculations are effected according to the following equations:

$$\Delta Xc(n) = \Delta Xc(n-1) + (Xe - Xd - \text{constant})/Kn$$

$$\Delta Xf(n) = \Delta Xf(n-1) + (Xf - X0)/Kn$$

where Ki is a weight constant depending on the number of correcting operations; X0 is the target stop position; $\Delta Xc(n)$ is the amount of correction for the deceleration starting position at the "n-th time" correcting operation; and $\Delta Xf(n)$ is the amount of correction for the stop position at the "n-th time" correcting operation.

It is seen from the above equations that, with a certain number of correcting operations, each of the amounts of correction required is converged. This means that the positional error can be stably maintained at a very low level. The manner of convergence chiefly depends on the weight constant Kn.

Prior to explaining the third to eighth embodiments of the present invention, the description will first be made to the principle used in these embodiments.

When an open-loop gain of a positioning control system is Ko(1/sec.), a rated torque of a motor is Tp(N·m), a feeding speed corresponding to the rated revolutions of the motor is Fr(m/sec.), a load torque calculated with respect to the drive shaft of the motor is Td(N·m), and the positional error is $\epsilon$(m), then the steady positional error due to changes in the friction force at the sliding components is expressed by:

$$\epsilon > (Fr/Ko) \cdot (Td/Tp)$$

On the other hand, the open-loop gain Ko of the servo system can not be easily increased because, when it is increased beyond a certain level, there would occur oscillation so that the positioning becomes quite unstable. This is the reason why the steady positional error $\epsilon$ can not be suppressed to a level lower than a certain level.

Figure 6:
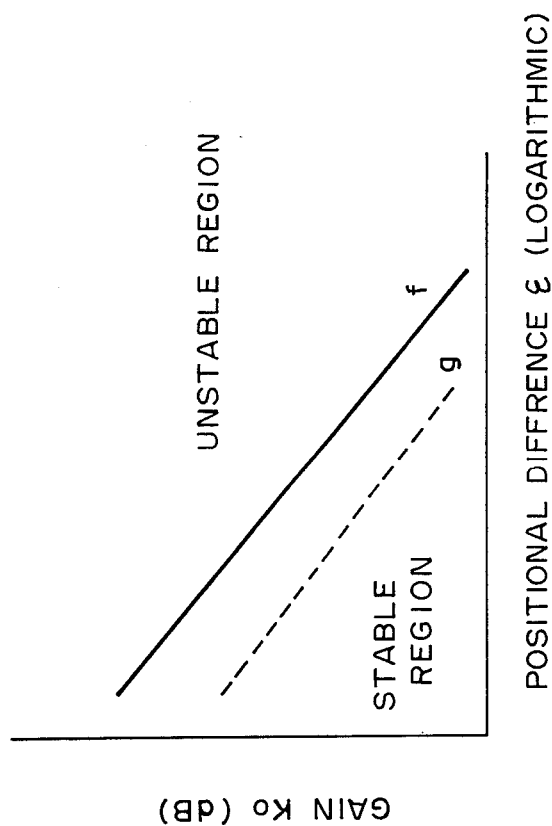
FIGS. 6–8 are graphs for illustrating the principle of a third embodiment of the present invention.

FIG. 6 shows an example of a critical limit of oscillation in a positioning control system for a stage using a ball screw, the critical limit being illustrated in connection with the relation between the gain Ko and the positional error or difference $\epsilon$. In this Figure, reference character f denotes the critical limit of oscillation of a driven member, while reference character g denotes the critical limit of oscillation of a driving member. According to this, the relation between the open-loop gain Ko and the positional error $\epsilon$ can be expressed by:

$$Ko = K \cdot \epsilon^{-P}$$

Since each of K and P is a constant of proportionality, the relation is variable depending on the position.

According to the known types of positioning control systems, a fixed gain is used after the changeover to the position-controlling mode from the speed-controlling mode. Thus, if a system having a viscous friction is used, it shows an attenuation waveform such as shown by a curve a in FIG. 8, for a low gain such as a gain characteristic a shown in FIG. 7. It is seen that, in the waveform a, the positional difference or error converges in the manner of an exponential function. On the other hand, for a higher gain such as a gain characteristic b shown in FIG. 7, the system shows an attenuation waveform such as shown by a curve b in FIG. 8 in which the positional error converges in an oscillating manner. In the case of a system having a dry friction, as compared therewith, the positional difference or error converges substantially rectilinearly to a certain level.

Figure 7:
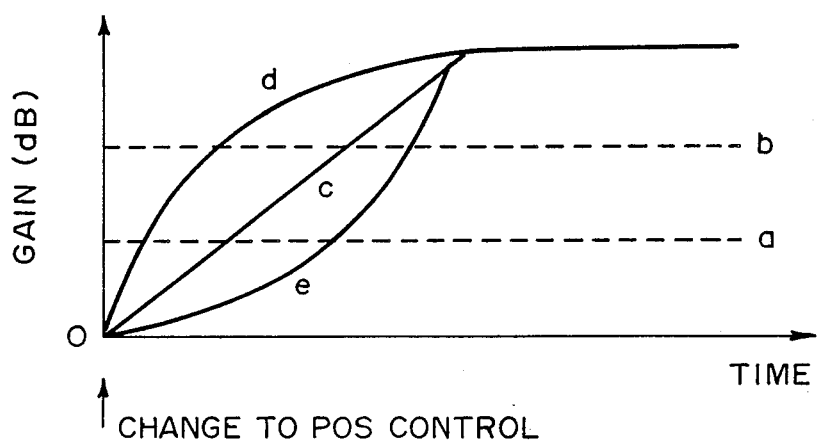
Figure 8:
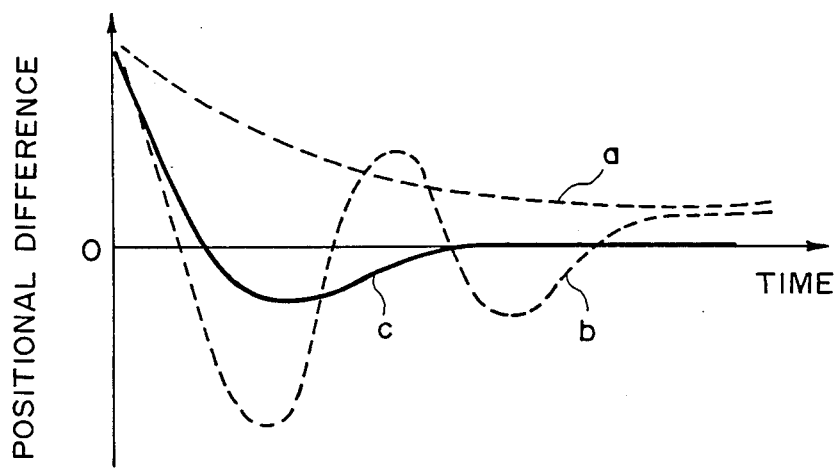

It will be understood from the above that, if the gain is increased with the lapse of time, such as shown by curves c–e in FIG. 7, so that gains as high as possible in the stable region are sequentially set in accordance with the varying positional error, a positioning characteristic such as shown by a curve c in FIG. 8 can be obtained, with the occurrence of oscillation being fully precluded.

This will be described in more detail. In the positional control according to the known types of servo control systems, there may occur a hysteresis in the positioning, due to the friction force at any sliding components or bearing members. That is, the positional difference signal (which is applied to an amplifier as an instruction signal) has a linear relation with the positional difference or error. So, if the positional error is very small, the generated torque of the motor can not overcome the above-described friction force. Such range in which the torque of the motor does not overcome the friction is called an "insensitive range" in which the movable member can not be moved. Usually, to obviate such problem, the sero control system is provided with an integration circuit so that the instruction voltage corresponding to the minute positional difference is integrated with time, to thereby produce a sufficient drive torque to overcome the friction force. With such arrangement, however, a prolonged time is required because of the use of the integration circuit.

As described in the foregoing, the positioning accuracy can be improved by increasing the open-loop gain of the servo system (see the aforementioned inequality). The improvements in the positioning accuracy means suppression of the steady positioning error. However, as discussed, increasing the open-loop gain will lead to occurrence of oscillation, which makes the servo system unstable.

In order to obviate these problems, according to the present invention, the open-loop gain of the system as a whole is controlled in the following manner:

(1) For a time period just after the changeover of the control mode to the position-controlling mode from the speed-controlling mode, the positional difference is relatively large. So, a relatively low gain is set to maintain the open-loop gain of the system as a whole at a lower level. Since the positional difference becomes smaller with the lapse of time, the open-loop gain is controlled to increase with the lapse of time.

(2) In order to fully eliminate the steady positioning error, it is necessary to produce an instruction voltage which is effective to generate a drive torque sufficient for overcoming the friction force or the like, irrespective of the degree of positional deviation. For this purpose, according to the present invention, the gain is variably controlled so that a higher open-loop gain is established for a smaller positional difference.

In summary, according to the present invention, an appropriate gain curve is selected in accordance with the kind of friction, the magnitude of the friction and the rigidity of the system. By doing so, the steady positioning error can be maintained at an extraordinarily low level and, therefore, the positioning accuracy is improved significantly. In FIG. 7, the curves c–e shows examples of the gain curves selected according to the present invention. Of these curves, the gain characteristic c is an example of rectilinear change, the gain characteristic d is an example of logarithmic change and the gain characteristic e is an example of change along an n-th order curve.

Figure 9:
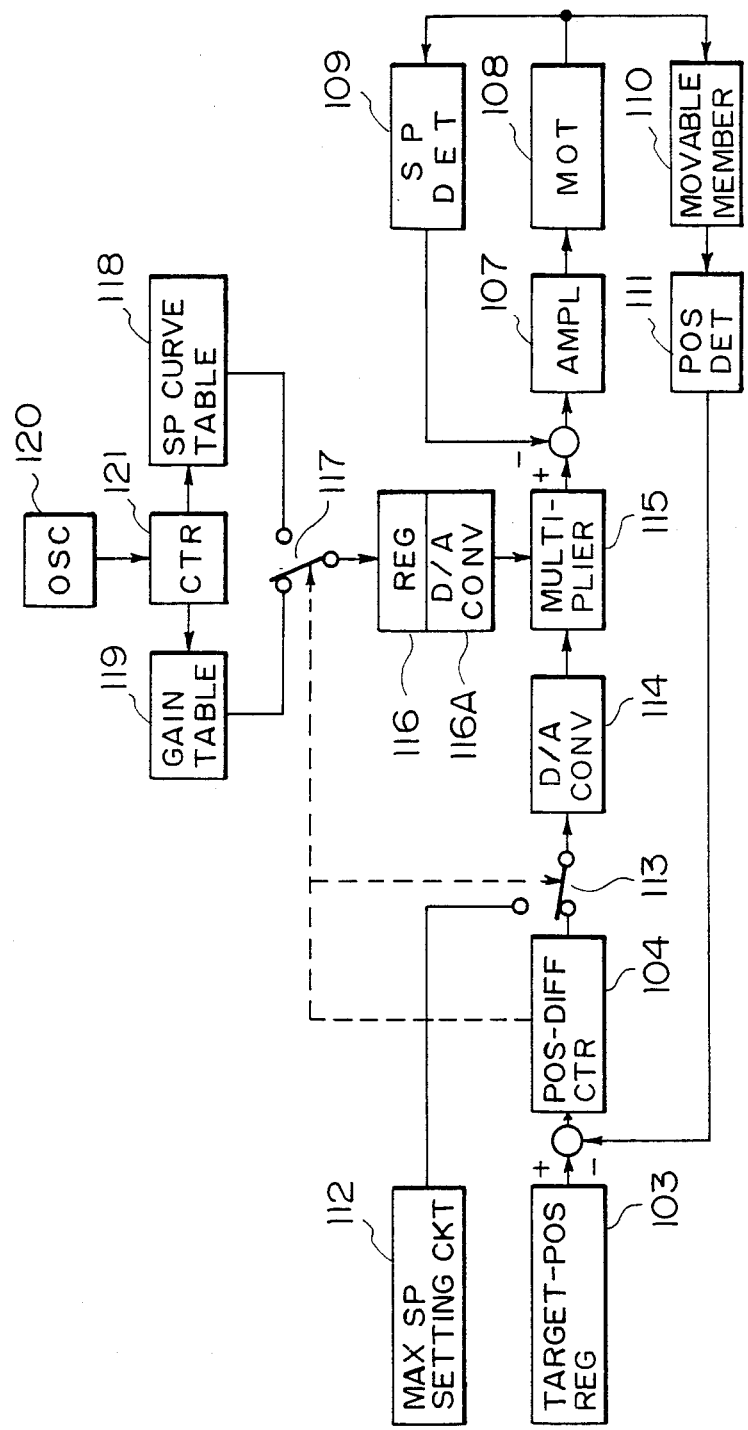
FIG. 9 is a block diagram showing a control system according to the third embodiment of the present invention.

FIG. 9 shows a control system according to a third embodiment of the present invention. As shown in this Figure, the control system includes a target stop-position register 103; a positional-difference counter 104; an amplifier 107 which is a servo amplifier; a motor 108 for driving a movable member 110 such as a slidable table or an arm of a robot; a motor speed detector 109 such as a tachometer generator; a position detector 111 which comprises position detecting means such as a rotary encoder, a linear scale or a laser interferometer and which also includes a current position register for storing the current position of the movable member 110; a maximum speed setting circuit 112; a selector 113 for selecting one of a speed data and a positional difference data; a digital-to-analog converter 114 (which hereinafter "D/A converter") for converting the digital data into an analog output; a multiplier 115; a register 116 for storing the data which is to be applied to a digital-to-analog converter 116A (which hereinafer "D/A converter"); a selector for selecting one of the speed data and a gain data; a memory 118 which is a speed curve table having stored therein speed-instructing data in accordance with speed curves; a memory 119 which is a gain setting table having stored therein gain setting values according to the gain curves; an oscillator 120 for producing timing clock pulses; and a counter 121 for selecting appropriate data from the speed curve table and the gain setting table in accordance with time.

Description will now be made to the operation of the control system of the FIG. 9 embodiment.

The operation of the control system as a whole is controlled by an unshown control unit such as a microprocessor or the like. Once the amount of movement (distance) to be made by the movable member 110 at the target stop position which is equal to the sum of the current position of the member 110 and the amount of movement thereof are determined by computations in the unshown control unit or by an operator's input operation, the unshown control unit operates to set in the maximum speed setting circuit 112 a maximum speed according to the amount of movement; to select an appropriate speed curve in the speed curve table 118; to set a target stop position in the target position register 103; and to select an appropriate gain curve in the gain setting table 119, according to the target stop position.

Figure 10:
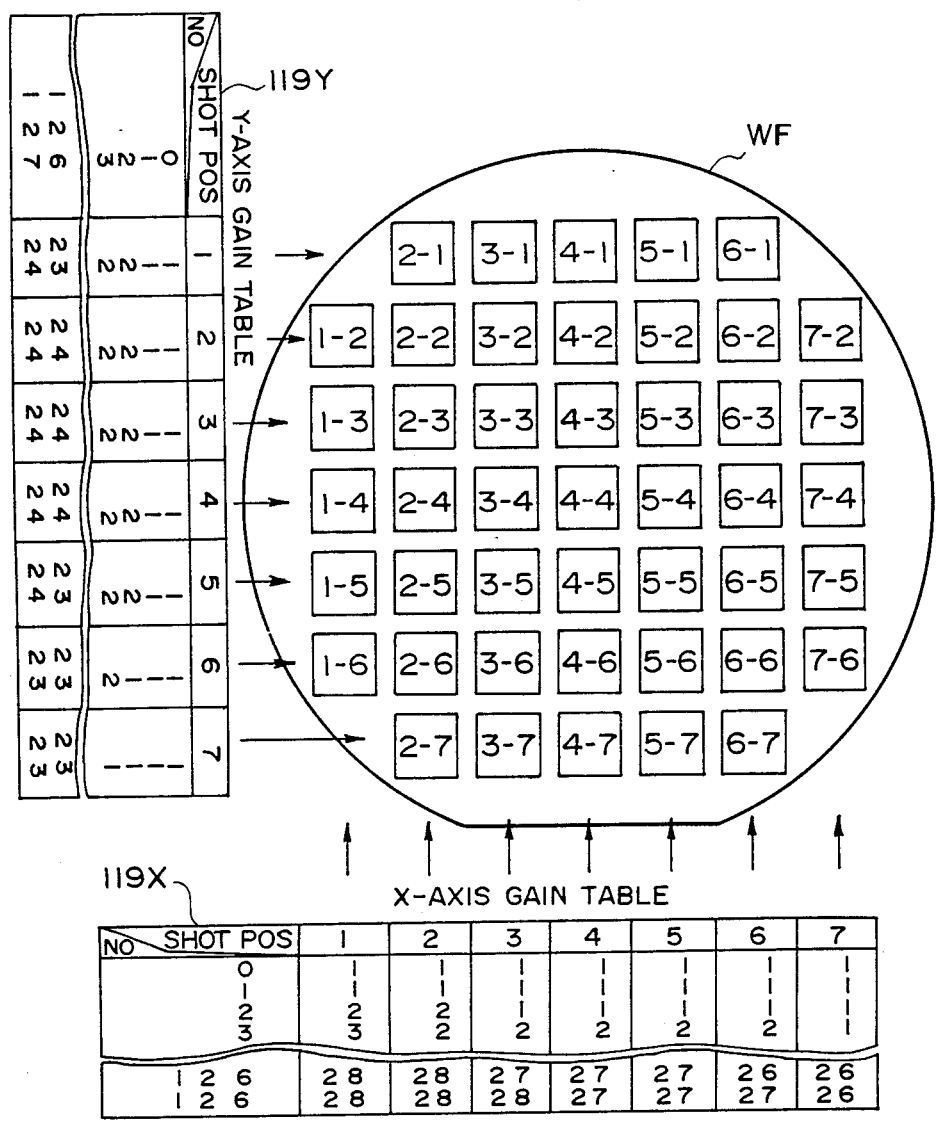
FIG. 10 shows gain tables prepared for the sake of positioning of a semiconductor wafer, according to the embodiment of FIG. 9.

As for the gain setting table 119, either a one-dimensional table in which the same set of numerical data are used independently of the target position selected or a two-dimensional table in which different sets of numerical data are prepared for different target positions may be used. In this embodiment, a two-dimensional table such as illustrated in FIG. 10 is used.

When, in the control system of FIG. 9, the target stop position and the maximum speed are set and after completion of setting of the oscillation frequency of the oscillator 120, the counter 121 is initialized and the selectors 113 and 117 are moved to their speed-controlling selecting positions. By this, the speed control in the regions a–d in FIG. 2 and along the curve A is effected. When, as the result of such speed control, the movable member 110 reaches a position in proximity to the target stop position, the selectors 113 and 117 are moved to their position-controlling selecting positions and, at the same time, an oscillation frequency corresponding to a selected gain curve in the gain table 119 is set in the oscillator 120. Also, the counter 121 is initialized. Thus, the control system is prepared for the positioning control in the variable gain mode according to this embodiment of the present invention.

In this mode of positioning control, the selected gain data in the gain setting table 119 is intermittently read out, with a constant time interval, in accordance with the counted number at the counter 121 counting the timing clock pules supplied from the oscillator 120. The data thus read out is stored in the register 116. The content of the gain table 119 is such as shown at 119X and 119Y in FIG. 10. The illustrated gain table 119 has been prepared for the positioning of a semiconductor wafer WF, for use in the manufacture of semiconductor devices. It is seen from this Figure that the gain table has stored therein two-dimensional information according to the target positions (shot positions).

Referring back to FIG. 9, a digital output of the register 116 is converted by the D/A converter 116A into an analog output, while the output signal of the positional difference counter 104 is converted by the D/A converter 114 into an analog output. These outputs of the D/A converters 116A and 114 are applied to the multiplier 115, in which the output of the D/A converter 114 is multiplied by the output of the D/A converter 116A, such as shown in FIGS. 11A–11C. By this, the open-loop gain of the control system as a whole is changed in accordance with the designated gain as supplied from the gain table 119 at that time. After the last data is read out from the gain table, the counter 121 does not count the clock pulses so that the register 116 holds the last-inputted gain data.

With the positioning control in the manner described in the foregoing, the undesirable occurrence of oscillation at the time of mode changeover to the position-controlling mode from the speed-controlling mode can be precluded. Also, reduction in the time required for the positioning, suppression of the steady positioning error and suppression of any fluctuation of the steady positioning error due to the direction of movement are assured.

Figure 12:
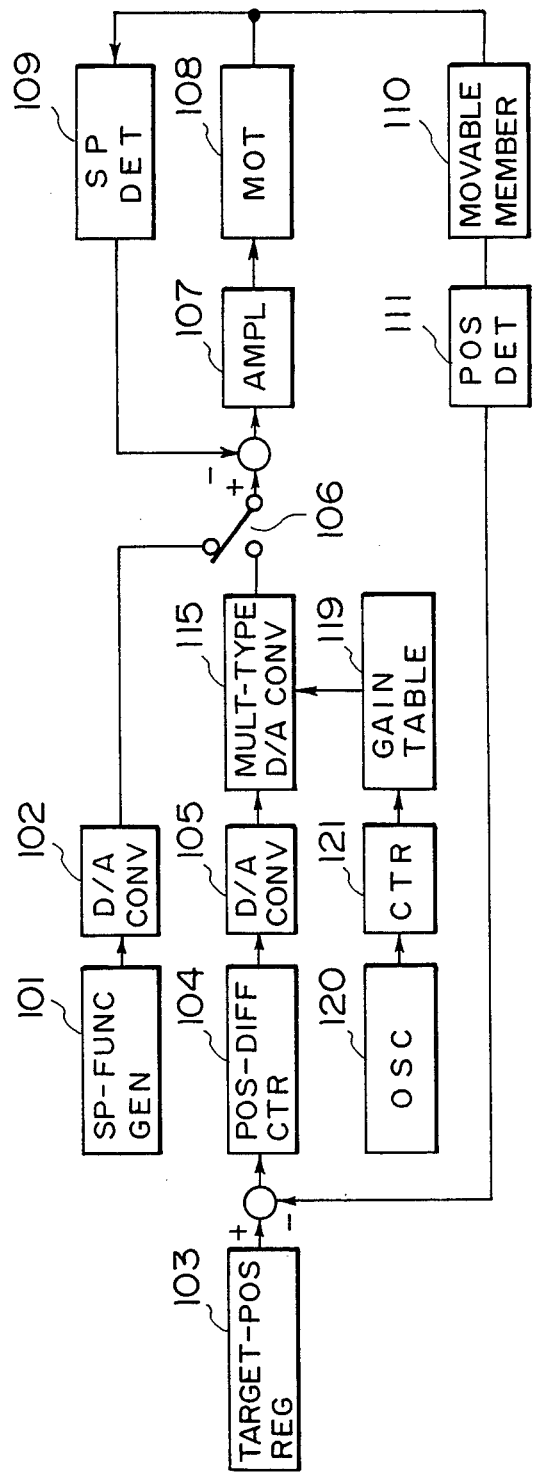
FIG. 12 is a block diagram showing a control system according to a fourth embodiment of the present invention.

FIG. 12 shows a control system according to a fourth embodiment of the present invention.

While, in the embodiment shown in FIG. 9, the maximum speed setting circuit 112, the speed curve table 118, the oscillator 120 and the counter 121 are combined to provide a function similar to that of the speed function generator 1 of the system shown in FIG. 3, the control system of the present embodiment (FIG. 12 embodiment) includes a speed function generator 101, similar to that in the FIG. 3 embodiment, which provides a speed controlling servo system. Also, the control system of this embodiment includes a gain table 119, an oscillator 120 and a counter 121 which are adapted to co-operate with each other to define a position controlling servo system. A multiplication-type digital-to-analog converter 115 (which hereinafter "D/A converter") is disposed between a digital-to-analog converter 105 (which hereinafter "D/A converter") and a position-controlling selecting terminal of an analog switch 106. By this multiplication-type D/A converter 115, an output of the D/A converter 105 is controlled in accordance with the gain data supplied from the gain table 119.

Figure 13:
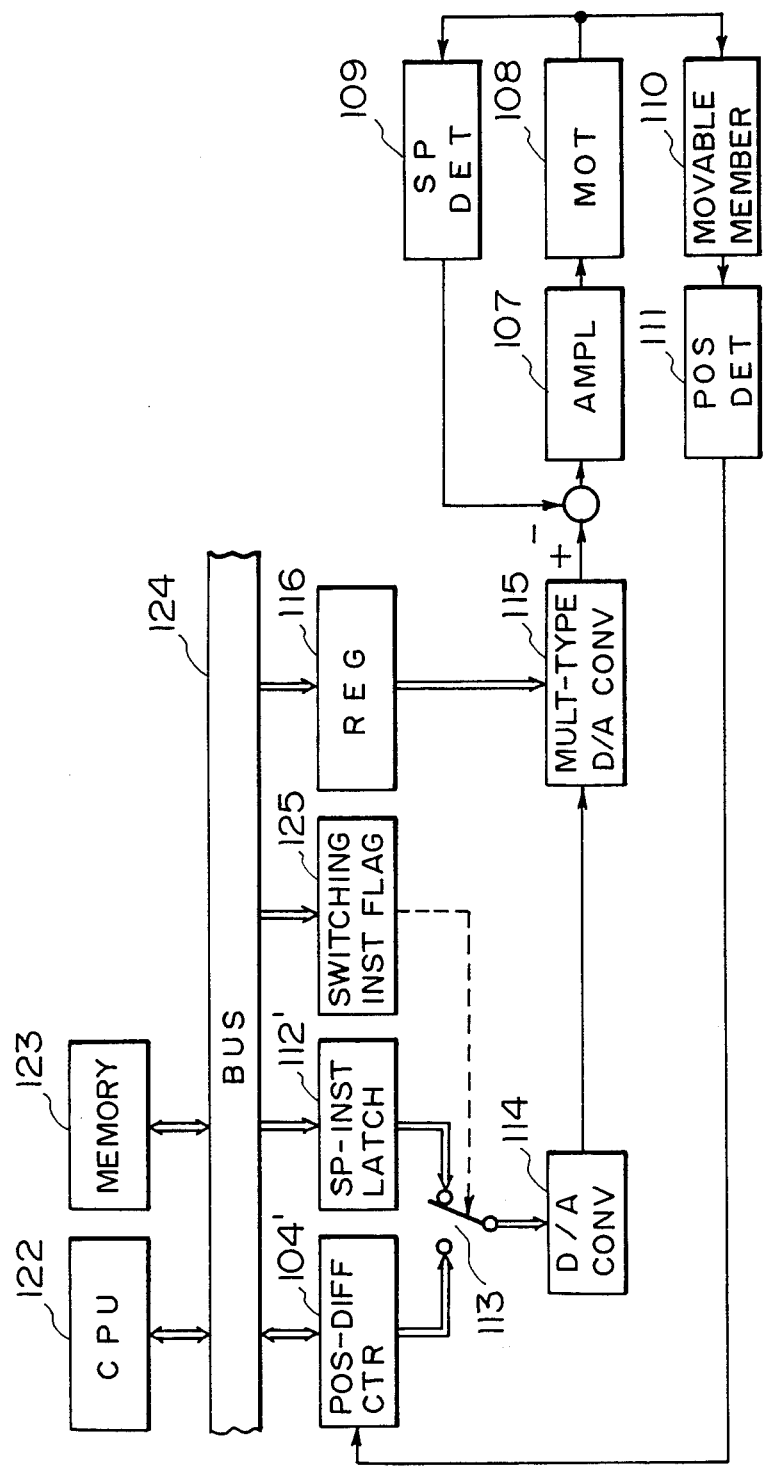
FIG. 13 is a block diagram showing a control system according to a fifth embodiment of the present invention.

FIG. 13 shows a control system according to a fifth embodiment of the present invention. This embodiment is a modification of the FIG. 12 embodiment.

As shown in FIG. 13, the control system of this embodiment includes a central processing unit 122 such as a microcomputer or the like, a memory device 123 such as a read only memory, a random access memory, etc., a bus 124 of the computer, a speed instructing latch 112', a positional-difference counter 104' and a switching instructing flag 125 operative on a selection 113 to select one of the speed instructing data from the latch 112' and the positional difference data from the counter 104'. The memory 123 has stored therein a speed curve table and a gain setting table.

In the present embodiment, the functions of the elements denoted by blocks 117–121 shown in FIG. 9 are performed in the programs of the computer.

Figure 14:
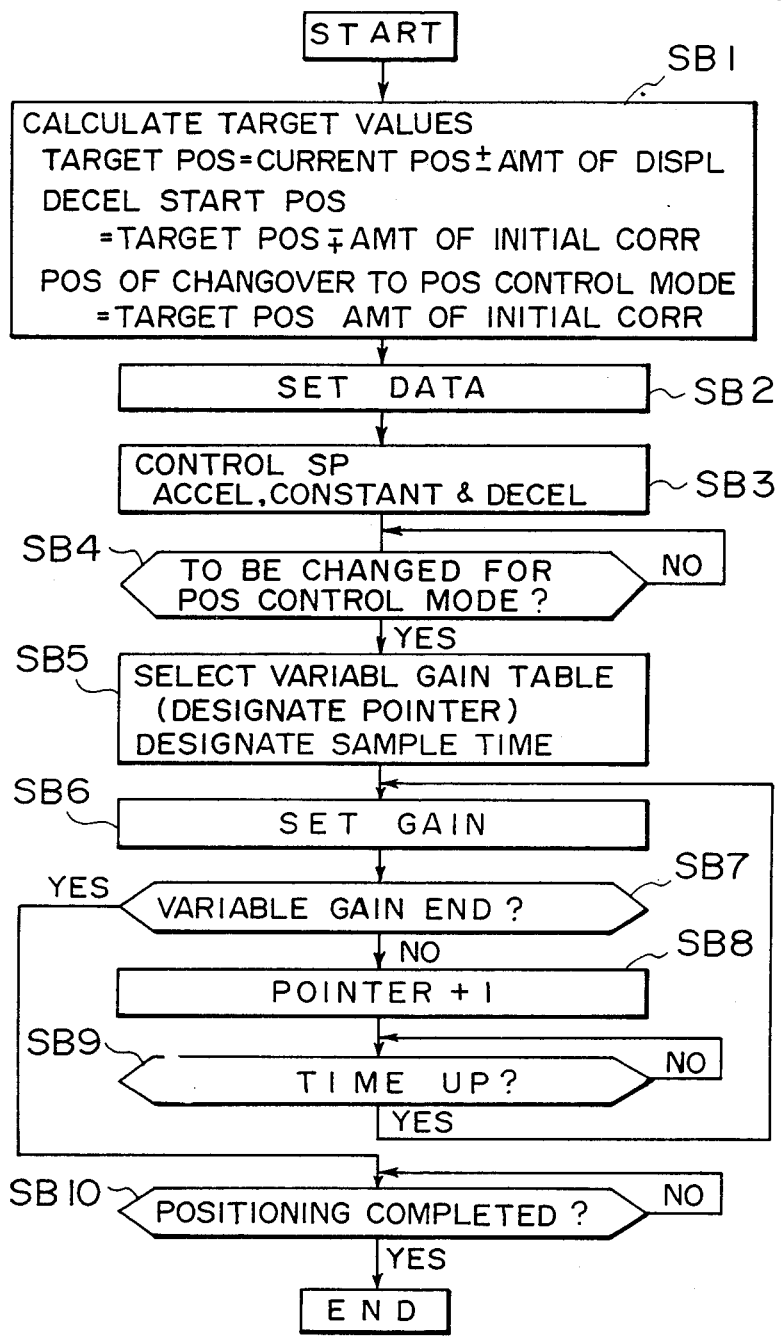
FIG. 14 is a flow chart showing the operation of the FIG. 13 embodiment.

Referring now to the flow chart of FIG. 14, description will be made to the operation of the control system of the FIG. 13 embodiment.

Once, in this control system, information related to the amount of movement (distance) is applied to the central processing unit 122 (which hereinafter "CPU"), the maximum speed is determined because the maximum acceleration has been determined on the basis of the motor torque, the load torque, an inertia, etc. Thus, at Step SB1, the time period for the deceleration according to the determined maximum speed and the amount of movement to be made during the deceleration period are determined in the CPU 122. Also, initial correction values (initial offset values) which have been preparatively stored are read out, so that the deceleration starting position and the position of changeover to the position-controlling mode are determined in the CPU 122.

Subsequently, these data are set in predetermined areas of the memory 123 (Step SB2) and the selector 113 is switched to be connected to the D/A converter 114. By this, the speed-controlling mode is established and, therefore, the speed controlling comprising the acceleration, the constant-speed movement and the deceleration in the regions a–d shown in FIG. 2 is effected relative to the movable member 110 (Step SB3). As described with reference to FIG. 2, the deceleration period from point c to point d is followed by another constant-speed period (ranging from point d to point e) in which the movable member 110 is moved at a constant creep speed. During such creep-speed period, the CPU 122 detects the control mode changeover position on the basis of the current-position data in the positional difference counter 104' (Step SB4). When the movable member 110 reaches the control mode changeover position, the CPU 122 supplies an instruction signal to the switching instructing flag 125 to change the control mode to the position-controlling mode from the speed-controlling mode.

After the changeover to the position-controlling mode, an appropriate portion of the gain table, such as shown in FIG. 15, is selected in accordance with the target position (Step SB5). Also, a pointer provided to read out the gain table prepared in the memory 123 is initialized. Then, the first gain data is read out and is set in the register 116 (Step SB6). By doing so, the open-loop gain of the control system as a whole can be variably controlled at the multiplication-type D/A converter 115 in accordance with the supplied gain data, as has hitherto been described with reference to FIG. 12. Next, at Step SB8, the pointer is advanced by one step to index the next address of the gain table.

Subsequently, the sampling time is checked and the data reading operation is maintained at a stand-by state until the next timing for outputting the gain data is reached (Step SB9). After the next outputting timing is reached, the above-described variable gain routine comprising reading of the gain data and various operations following it is repeated.

In this manner, the open-loop gain of the control system is changed such as shown by the gain curves in FIG. 7. Also, after the setting of the gain and before the stepwire advancement of the pointer, whether or not the reading of a series of gain data is completed is dicriminated at Step SB7. If the pointer indexes the last data in the selected gain table, the variable gain routine is accomplished (Step SB7) so that the sequence proceeds to Step SB10 at which whether or not the positioning is completed is discriminated. When the positional error comes within a predetermined tolerance, the positioning control operation is completed.

Various modifications are possible within the scope of the present invention. For example, in the structure shown in FIG. 13, the selector 113, the switching instructing flag 125, the register 116 and the multiplication-type D/A converter 115 may be omitted and, in place thereof, the speed instructing latch 112' may be directly connected to the D/A converter 114. During the position-controlling mode, in such case, the computer reads out the content of the current-position register of the position detector 111, i.e. reads the current position of the movable member, and supplies to the speed instructing latch 112' an instruction signal which is obtained by multiplying an instruction voltage corresponding to the positional difference by the gain data. Such arrangement is preferable because it allows omission of a number of hardware components.

As for the shape of the speed-instructing curve, a bar-sine wave, a cycloidal wave, an n-th order curve, etc. may be used in place of the trapezoidal wave as described in the foregoing.

FIG. 16 shows a control system according to a sixth embodiment of the present invention.

As shown in this Figure, the control system according to this embodiment includes a target stop position register 203; a positional-difference counter 204; a servo amplifier 207; a motor 208 for driving a movable member 210 such as a slidable table or an arm of a robot; a motor speed detector 209 such as a tachometer generator; a position detector 211 which comprises a rotary encoder, a linear scale or a laser interferometer and which also includes a current position register for storing the detected position of the movable member 210; a maximum speed setting circuit 212; a selector 213 for selecting one of speed-instructing data and positional-difference data; a digital-to-analog converter 214 (which hereinafter "D/A converter") for converting the digital data into an analog output; a multiplication-type digital-to-analog converter 215 (which hereinafter "multiplication-type D/A converter"); a register 216 for storing the data which is to be applied to the multiplication-type D/A converter 215; a selector 217 for selecting one of the speed-instructing data and gain data; a memory 218 which is a speed curve table having stored therein speed-instructing data according to the speed curves; a memory 219 which is a gain setting table having stored therein gain setting values according to the positional errors or differences; an oscillator 220 for producing timing clock pulses for the speed curve; and a counter for selecting the data from the speed curve table in accordance with the time.

As in the foregoing embodiments, once the amount of movement (distance) to be made by the movable member and the target stop position which is the sum of the current position of the movable member and the amount of movement thereof are determined, an appropriate maximum speed corresponding to the amount of movement is set in the maximum speed setting circuit 212. Also, an appropriate speed curve is selected in the speed curve table 218. Further, the target stop position is set in the register 203 and an appropriate gain curve is selected in the gain setting table 219, in accordance with the target stop position.

As for the gain setting table 219, either a one-dimensional table or a two-dimensional table, as described in the foregoing, may be used. In this embodiment, a one-dimensional table such as illustrated in FIG. 17 is used.

When in the control system of FIG. 16, the target stop position and the maximum moving speed are set and the setting of the oscillation frequency of the oscillator 220 is completed, the counter 221 is initialized and the selectors 213 and 217 are moved to their speed-controlling selecting positions. By this, the moving speed of the movable member is controlled according to the speed curve A (FIG. 2) within the regions of a–d. When, as a result of such speed controlling, the movable member 210 reaches a position in proximity to the target stop position, the selectors 213 and 217 are moved to their position-controlling selecting positions, whereby the control system is now prepared for the positioning control in a variable gain mode in accordance with one of the major features of this embodiment of the present invention.

In the positioning control according to this mode, appropriate gain data in the gain table 219 is selected on the basis of the positional difference, i.e. the difference between the target stop position and the current position. The selected data is stored in the register 216. The multiplication-type D/A converter 215 controls an analog voltage supplied from the D/A converter 214 in accordance with an output signal of the register 216, thereby to change the open-loop gain of the control system. By doing so, the open-loop gain Ko of the control system can always be maintained at a value best suited for the position difference. Accordingly, it is possible to suppress the steady positioning error and also to suppress any fluctuation in the steady positioning error due to the direction of movement. The change in the position of the movable member after the change-over to the position-controlling mode is converged or terminated like a critical damping manner such as shown by the curve c in FIG. 8 or a slightly oscillating manner. Thus, the time required for the positioning is reduced.

Figure 18:
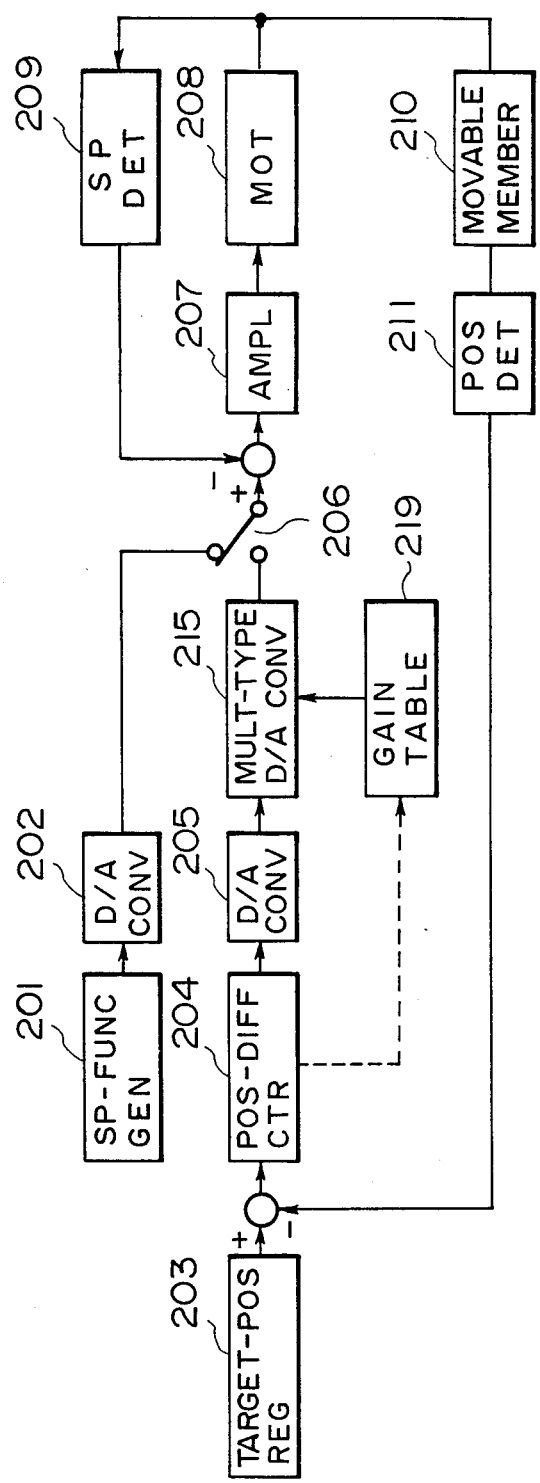
FIG. 18 is a block diagram showing a control system according to a seventh embodiment of the present invention.

FIG. 18 shows a control system according to a seventh embodiment of the present invention which is a slight modification of the FIG. 16 embodiment. That is, as compared with the FIG. 16 embodiment, the control system of the present embodiment is arranged such that a speed controlling portion and a position controlling portion of digital structures are separatedly provided, and an appropriate one of them is selected at an analog portion. Except for this point, the control system of this embodiment has substantially the same structure as of that of the FIG. 16 embodiment. Therefore, detailed description of this embodiment will be omitted here only for the sake of simplicity of explanation by assigning the same reference numerals to corresponding elements.

FIG. 19 shows a control system according to an eighth embodiment of the present invention.

As shown in this Figure, the control system of the present embodiment includes a central processing unit 222 such as a microcomputer or the like, a memory device 223 such as a read only memory, a random access memory, etc., a bus 224 of the computer, a speed-instructing latch 212', a current position (differential position) counter 204', and a switching instructing flag 225 operative on a selector 213 to select one of speed instruction data and current position data.

In the control system of this embodiment, the functions of the elements denoted by blocks 217–221 shown in FIG. 16 are performed in programs of the computer.

Figure 20:
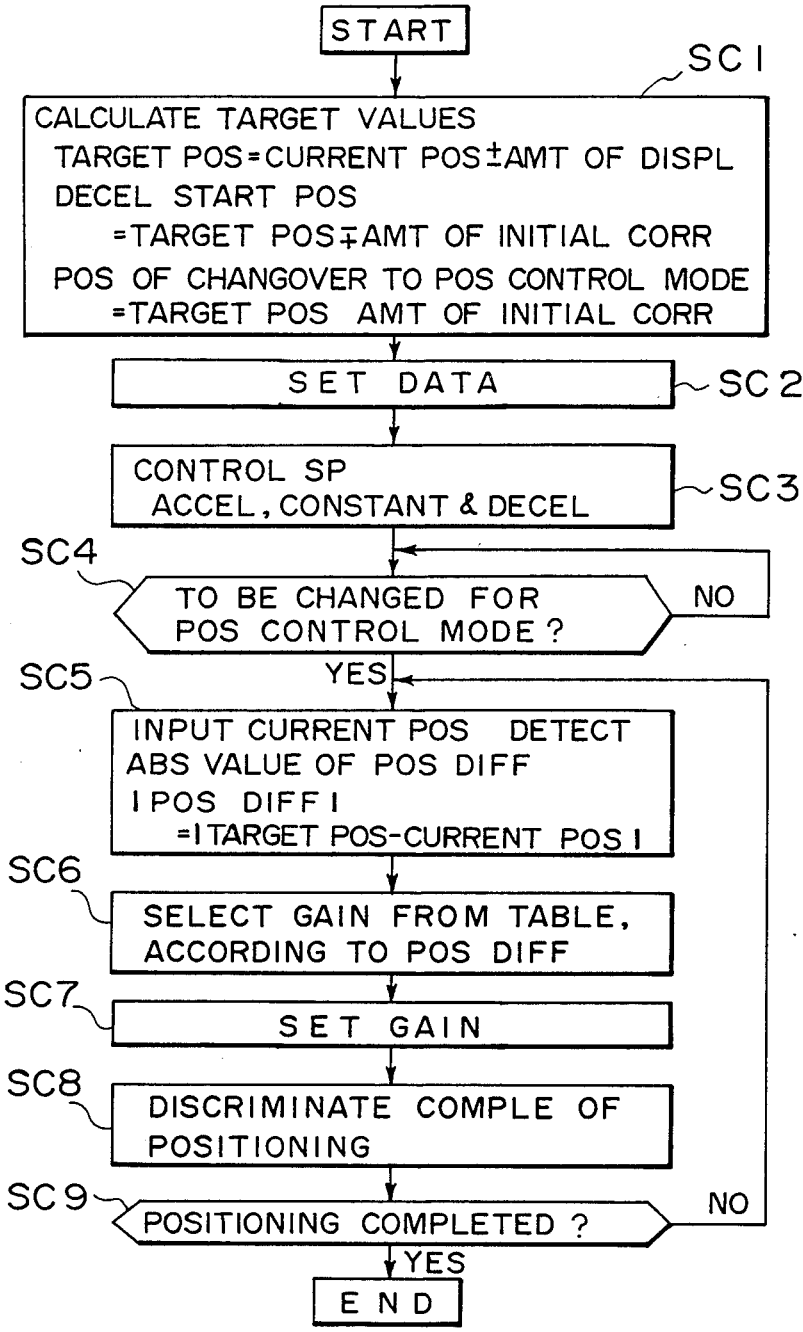
FIG. 20 is a flow chart showing the operation of the FIG. 19 embodiment.

Referring now to the flow chart of FIG. 20, description will be made to the operation of the control system of the FIG. 19 embodiment.

When, in this control system, information related to the amount of movement (distance) is supplied at Step SC1, the maximum speed is determined in the central processing unit 222 (which hereinafter "CPU") because the maximum acceleration has been determined in accordance with the motor torque, the load torque, the inertia, etc. Also, the time period for the deceleration according to the thus determined maximum speed and the amount of movement to be made during the deceleration period are determined. Then, the deceleration starting position and the control change-over position are determined.

Subsequently, at Step SC2, these data are set in predetermined areas of the memory 223. Also, an instruction signal is applied to the switching instructing flag 225 so as to switch the selector 213 so that the speed-instructing latch 212' is connected to the D/A converter 214. By this, the speed-controlling mode is established (Step SC3), such that the speed controlling comprising the acceleration, the constant-speed movement and the deceleration shown in the regions a–d in FIG. 2 are effected relative to the movable member 210. In another constant-speed region ranging from point d to point e which follows the deceleration period and in which the movable member is moved at a low or creep speed, the control mode changeover position is detected on the basis of an output of a position detector 211. When the movable member 210 reaches the mode changeover position, an instruction signal is applied to the switching instructing flag 225, whereby the position-controlling mode is established (Step SC4).

After the changeover to the position-controlling mode, an appropriate gain table according to the target position is selected from a two-dimensional gain table such as shown in FIG. 17, for example. Then, at Step SC5, the current position (differential position) of the movable member is read out from the positional difference counter 204'. The difference between the thus detected current position and the target stop position, i.e. the positional difference, is calculated in an absolute value. Subsequently, at Step SC6, appropriate gain data in accordance with the detected absolute value of the positional difference is read out from the gain table. The gain data thus read out is stored in the register 216 (Step SC7).

Next, at Step SC8, whether or not the positioning is completed is discriminated. This discrimination is made by examining whether or not the operation is completed within a predetermined time period after initiation of the positioning control and by examining whether or not the positional difference comes within a predetermined tolerance. if the positionl difference is out of the tolerance although the operation is completed within the predetermined time period after initiation of the positioning control, it is discriminated that the positioning is insufficient (Step SC9) and, therefore, the above-described operations such as calculation of the positional difference, reading-out of the gain data, discrimination of completion of the positioning, etc. are repeated. If, on the other hand, the positional difference is within the tolerance, it means that the positioning is really completed. Therefore, the positioning operation is terminated. With the above-described operations, the steady positioning error is suppressed to a very low level while the fluctuation in the steady positioning error owing to the direction of movement is minimized. Accordingly, the positioning accuracy is improved significantly.

If the above-described predetermined time period is elapsed before the positional difference comes within the tolerance, it is discriminated that the positioning is not possible. So, an indication or a display of "error" for the sake of alarm is effected.

While the invention has been described with reference to the structure disclosed herein, it is not confined to the details set forth and this application and is intended to cover such modifications or changes as many come within the purposes of the improvements or the scope of the following claims.

What is claimed is:

1. A control system for positioning a movable member, said system comprising:
    first control means operative to move the movable member at a first moving speed toward a target stop position, said first control means also being operative to decrease said first moving speed of the movable member to a second moving speed when the movable member moves from a predetermined deceleration starting position toward said target stop position;
    second control means operative on the movable member, after said second moving speed is established, to place the movable member at said target stop position with a relatively high positional accuracy;
    means for detecting a positional error of the movable member with respect to a reference at a time when said second moving speed is established; and
    means for changing said deceleration starting position on the basis of detection by said detecting means.

2. A system according to claim 1, also including means for correcting data related to said target stop position on the basis of a positional error of the movable member when the movable member is placed by said second control means.

3. A control system for positioning a movable member, said system comprising:
    servo control means for moving the movable member to a target stop position, said servo control means being operative to move the movable member toward a target stop position in a first control mode in which the speed of movement of the movable member is controlled and, thereafter, to move the movable member in a second control mode in which a positioning accuracy is controlled, thereby to place the movable member at the target stop position;
    means for determining a positional difference between the target stop position and a current position of the movable member; and
    means for setting, in accordance with elapsed time, a gain of said servo control system after changeover to said second control mode from said first control mode; and
    wherein said setting means includes a multiplier for multiplying a positional difference by a gain according to the elapsed time to provide a modified positional difference.

4. A system according to claim 3, wherein said setting means has a plurality of gain curves for allowing variable setting of the gain of said servo control means in said second control mode in accordance with the target stop position. indicating a distance between the target stop position and a current position of the movable member.

5. A control system for positioning a movable member, said system comprising:
    servo control means for moving the movable member to a target stop position, said servo control means being operative to move the movable member toward the target stop position in a first control mode in which the speed of movement of the movable member is controlled and, thereafter, to move the movable member in a second control mode in which a stop position accuracy is controlled, thereby to place the movable member at the target stop position;
    means for determining a positional difference indicating a distance between the target stop position and a current position of the movable member; and
    means for setting a gain of said servo control system in accordance with the positional difference 6. A system according to claim 5, wherein said setting means includes a multiplier for multiplying the positional difference by the gain according to the positional difference to provide a modified positional difference.

7. A system according to claim 5 or 6, wherein setting means has a plurality of gain tables for allowing selection of a gain of said servo control system in accordance with the target stop position.

8. A control system for positioning a movable member, said system comprising:
    servo control means for moving the movable member to a target stop position, said servo control means being operative to move the movable member toward the target stop position in a first control mode in which the speed of movement of the movable member is controlled and, thereafter, to move the movable member in a second control mode in which a stop position accuracy is controlled, thereby to place the movable member at the target stop position;

means for determining a positional difference indicating a distance between the target stop position and a current position of the movable member; and means for setting a gain of said servo control system after changeover to said second control mode from said first control mode, in accordance with the target stop position.

9. A system according to claim 8, wherein said setting means includes a multiplier for multiplying the positional difference by the gain according to the target stop position to provide a modified positional differences.

* * * * *

UNITED STATES PATENT AND TRADEMARK OFFICE
CERTIFICATE OF CORRECTION

PATENT NO. : 4,710,865

DATED : December 1, 1987

INVENTOR(S) : MAKOTO HAIGOMURA

It is certified that error appears in the above-identified patent and that said Letters Patent is hereby corrected as shown below:

COLUMN 1

Line 19, "stepwisely" should read --stepwise--.

COLUMN 2

Line 1, "is" should read --in--.
    Line 46, "object" should read --movable member--.
    Line 57, "including first" should read
        --including a first--.

COLUMN 4

Line 6, "step-position" should read
        --stop-position--.
    Line 47, "/substracting" should read
        --/subtracting--.
    Line 48, "to" should read --of--.

UNITED STATES PATENT AND TRADEMARK OFFICE
CERTIFICATE OF CORRECTION

PATENT NO. : 4,710,865

DATED : December 1, 1987

INVENTOR(S) : MAKOTO HAIGOMURA

It is certified that error appears in the above-identified patent and that said Letters Patent is hereby corrected as shown below:

COLUMN 6

Line 4, "terminatd" should read --terminated--.

COLUMN 9

Line 23, "Ki" should read --Kn--.
    Line 37, "to" should read --of--.

COLUMN 10

Line 40, "sero" should read --servo--.

COLUMN 11

Line 47, "to" should read --of--.

COLUMN 13

Line 21, "selection 113" should read --selector 113--.

UNITED STATES PATENT AND TRADEMARK OFFICE
CERTIFICATE OF CORRECTION

PATENT NO. : 4,710,865                  Page 3 of 4

DATED : December 1, 1987

INVENTOR(S) : MAKOTO HAIGOMURA

It is certified that error appears in the above-identified patent and that said Letters Patent is hereby corrected as shown below:

COLUMN 14

Line 24, "stepwire" should read --stepwise--.
Line 25, "di-" should read --dis--.

COLUMN 15

Line 59, "position" should read --positional--.

COLUMN 16

Line 31, "to" should read --of--.
Line 43, "change-over" should read --changeover--.

COLUMN 17

Line 16, "if the position1" should read --If the positional--.
Line 33, "is" should read --has--.
Line 41, "many" should read --may--.

UNITED STATES PATENT AND TRADEMARK OFFICE
CERTIFICATE OF CORRECTION

PATENT NO. : 4,710,865

DATED : December 1, 1987

INVENTOR(S) : MAKOTO HAIGOMURA

It is certified that error appears in the above-identified patent and that said Letters Patent is hereby corrected as shown below:

COLUMN 18

Lines 30-32, "indicating a distance between the target stop position and a current position of the movable member." should be moved and inserted at Column 18, line 50, after "difference".

Line 55, "wherein setting" should read --wherein said setting--.

COLUMN 20

Line 6, "differences." should read --difference.--.

Signed and Sealed this

Sixteenth Day of August, 1988

Attest:

DONALD J. QUIGG

Attesting Officer

Commissioner of Patents and Trademarks